United States Patent [19]
Espinueva

[11] Patent Number: 5,190,268
[45] Date of Patent: Mar. 2, 1993

[54] FENCE CONSTRUCTION SYSTEM FOR SLOPING TERRAIN

[76] Inventor: Belarmino G. Espinueva, 2710 Glen Evans Ct., San Jose, Calif. 95148

[21] Appl. No.: 822,362

[22] Filed: Jan. 17, 1992

Related U.S. Application Data

[63] Continuation-in-part of Ser. No. 782,826, Oct. 25, 1991.

[51] Int. Cl.⁵ .............................................. E04H 17/14
[52] U.S. Cl. ........................................ 256/67; 252/65; 403/232.1
[58] Field of Search ...................... 256/67, 65, DIG. 4; 403/232.1

[56] References Cited

U.S. PATENT DOCUMENTS

| | | | |
|---|---|---|---|
| 3,005,623 | 10/1961 | Kusel et al. ............................. | 256/67 |
| 3,989,226 | 11/1976 | Burgess .................................. | 256/65 |
| 4,101,226 | 7/1978 | Parisien ................................. | 403/4 |
| 4,114,860 | 9/1978 | Parisien ................................. | 256/65 |
| 4,114,861 | 9/1978 | Long ..................................... | 256/67 |
| 4,239,414 | 12/1980 | Williamson ........................... | 403/387 |
| 4,280,686 | 7/1981 | Wack .................................... | 256/65 |
| 4,286,772 | 9/1981 | Parisien ................................. | 256/65 |
| 4,688,769 | 8/1987 | Smrt ..................................... | 256/65 |
| 4,792,122 | 12/1988 | Smrt ..................................... | 256/68 |
| 4,899,991 | 2/1990 | Brunkan ............................... | 256/69 |
| 4,923,176 | 5/1980 | Heinz .................................... | 256/65 |
| 4,944,494 | 7/1990 | Pendleton ............................. | 256/68 |
| 4,951,925 | 8/1990 | Schultz et al. ........................ | 256/65 |
| 4,986,513 | 1/1991 | Schultz et al. ........................ | 256/65 |
| 5,004,369 | 4/1991 | Young .................................. | 403/232.1 |
| 5,026,028 | 6/1991 | Ooi et al. ............................... | 256/67 |

OTHER PUBLICATIONS

Simpson Strong-Tie NER-393, LU 24 construction bracket-three photographs.

*Primary Examiner*—Andrew V. Kundrat
*Attorney, Agent, or Firm*—James J. Leary

[57] ABSTRACT

A fence construction system for simple and rapid construction of a wooden fence on level or sloping terrain. The system includes an adjustable lower metal bracket for fastening the lower rail and kickboard to the fence posts and an upper bracket for fastening the upper rail to the fence posts. The upper and lower brackets may be adjusted at the construction site without special tools to accommodate sloping terrain with a ground angle up to 45° from the horizontal. Also disclosed is a fence post cap which may be used in place of the upper bracket to fasten the upper rail to the top of the fence posts. With the system, a durable traditional style good neighbor fence may be rapidly assembled on varying terrain.

8 Claims, 13 Drawing Sheets

FENCE CONSTRUCTION SYSTEM FOR SLOPING TERRAIN

This application is a continuation in part of the inventor's copending patent application Ser. No. 07/782,826 filed Oct. 25, 1991 for a Fence Construction System.

This invention relates to a system for simple and rapid construction of a fence on sloping terrain, including a system of angled metal brackets that can be adjusted for changes in the slope of the ground.

BACKGROUND OF THE INVENTION

Decorative or traditional style wooden fences are often used in landscaping for visual appeal, to mark boundaries, or for privacy and security. As the material and labor costs of housing construction have risen in recent years so, too, has the cost of constructing a fence. This is especially true for traditional wooden fences such as the "good neighbor" fence because of the large amount of skilled labor involved in the traditional construction. It is desirable therefore to devise a method for rapid and economical assembly of a wooden fence with a minimum of skilled labor while maintaining the sturdiness of the construction as well as the traditional visual appeal.

A good neighbor fence, the type to which this invention is directed, is a traditional style of solid board fence which is constructed to look the same from both sides. That is, there is no "good" or "bad" side. Both sides of the fence are equally attractive. Assembly brackets have been suggested for post-and-rail fences, metal fences, and chain link fences, but as far as the inventor knows this is the first approach that has been suggested to make the construction of solid board fences and especially good neighbor fences more efficient and economical.

The inventor's copending patent application for a Fence Construction System discloses a system of metal brackets for rapid and sturdy construction of a solid board fence of the good neighbor type. The system as disclosed is suitable for construction of a fence on level ground or ground with a slight slope up to about 5° from the horizontal. The present invention extends the usefulness of the fence construction system for constructing fences on more steeply sloping terrain by providing angled brackets that are adjustable in angle and in depth to accommodate the varying changes in slope.

DISCUSSION OF THE PRIOR ART

U.S. Pat. Nos. 3,989,226 to Burgess, 4,114,861 to Long, and 4,280,686 to Wack all disclose metal brackets for the assembly of wooden post-and-rail fences. U.S. Pat. Nos. 4,688,769 and 4,792,122 to Smrt and 4,899,991 to Brunkan disclose metal brackets for assembling a combined wooden and metal fence. U.S. Pat. No. 4,114,860 to Parisien discloses a fence system including brackets for assembling a chain link fence which may in the alternative include fence boards or panels. U.S. Pat. Nos. 4,951,925 and 4,986,513 to Schultz et al. and 4,923,176 to Heinz disclose connectors for assembling metal fences that can be angled to accommodate changes in the direction or the slope of the fence. None of the foregoing patents disclose, nor are applicable to, an improved method for constructing a traditional solid board fence or a wooden good neighbor fence on sloping terrain.

OBJECTIVES OF THE INVENTION

In keeping with the foregoing discussions, one major objective of the present invention is to provide a means for rapid and economical construction of a solid board fence on sloping terrain. To this end it should minimize the need for time consuming assembly techniques that require a high degree of skill or specialized tools such as dado joints, mortise-and-tenon joints, or miter joints. Concurrently another major objective of the invention is to provide a rapid means of assembling a fence that enhances (or at the very least, does not diminish) the structural strength and the visual appeal of the finished fence.

Secondary to these objectives, it is also an objective to provide a simple and convenient means to hold the fence together temporarily until the final attachment means such as nails or screws are driven in.

DETAILED DESCRIPTION OF THE INVENTION

Figure 1:
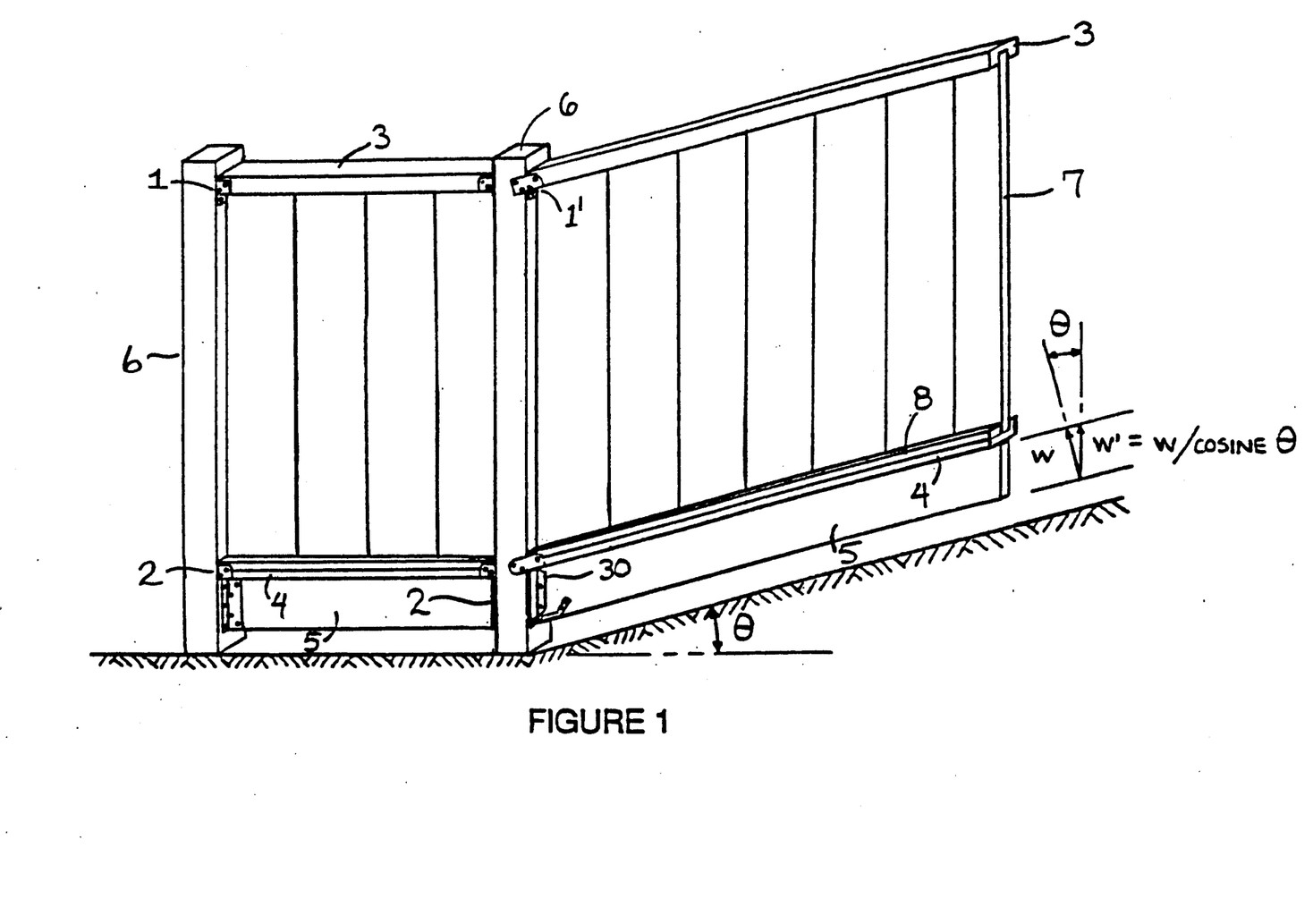
FIG. 1 shows a segment of a good neighbor fence assembled with the fence construction system.

Referring to FIG. 1, which shows a segment of a good neighbor fence assembled with the fence construction system, we can see why there is a need for special brackets for constructing fences on sloping ground. Section of the fence on the left is constructed on level ground, the upper bracket 1 and lower bracket 2 join the upper rail 3 and the lower rail 4 and kick board 5 to the fence post 6 at right angles. The right-hand section is built on sloping ground so that the fence must be constructed at an angle $\theta$ with the horizontal. It can easily be seen that the upper bracket 1 and lower bracket 30 must be angled to accommodate for the fact that the upper rail 3 and the lower rail 4 and kick board 5 meet the fence post 6 at an angle $\theta$. It is less obvious, however, that the depth of the lower bracket 30 must also change to accommodate the change in effective width, W', of the kickboard 5 when it is mitered at the angle $\theta$. The effective width, W' is also equal to the measured length along the miter cut. When a kickboard of width W is miter cut at an angle $\theta$, the effective width of the kickboard W' which the lower bracket must fit becomes W/cosine$\theta$. This poses no problem for small angles from 0° to about 5°, because the difference between W and W' is so small that special brackets might not be needed. However, as the angle $\theta$ increases, W' becomes significantly larger than W so that the bracket will have to be made larger to hold the kickboard. Column A of Table 1 below shows how W' changes with the change in angle $\theta$. Column B shows W' for a kickboard made from a standard one-by-eight board which measures 7½ inches by 1⅝ inch. Rather than making a different size bracket for every possible angle $\theta$, it is preferable to have one bracket that may be adjusted at the construction site to accommodate the change in angle and the change in depth needed for varying slope terrain.

TABLE 1

| Ground Angle $\theta$ | Column A W' = W/cosine$\theta$ | Column B W' for a one-by-eight kickboard |
|---|---|---|
| 0° | W | 7.50 inches |
| 5° | 1.004 W | 7.52 inches |
| 10° | 1.02 W | 7.62 inches |
| 15° | 1.04 W | 7.76 inches |
| 20° | 1.06 W | 8.09 inches |
| 25° | 1.10 W | 8.28 inches |
| 30° | 1.15 W | 8.66 inches |
| 35° | 1.22 W | 9.16 inches |
| 40° | 1.31 W | 9.79 inches |
| 45° | 1.41 W | 10.61 inches |

FIG. 1 shows how the present invention may be used to construct a good neighbor fence on level ground or on a slope. In the lefthand section, the upper bracket 1 and lower bracket 2 are used to join the upper rail 3 and the lower rail 4 and kickboard 5 to the fence posts 6 at a right angle. In the righthand section, the angle of the upper bracket 1 and the angle and depth of the lower bracket 30 have been adjusted so that the miter cut upper rail 3 and the lower rail 4 and kickboard 5 join the fence post at an angle $\theta$.

Figure 2:
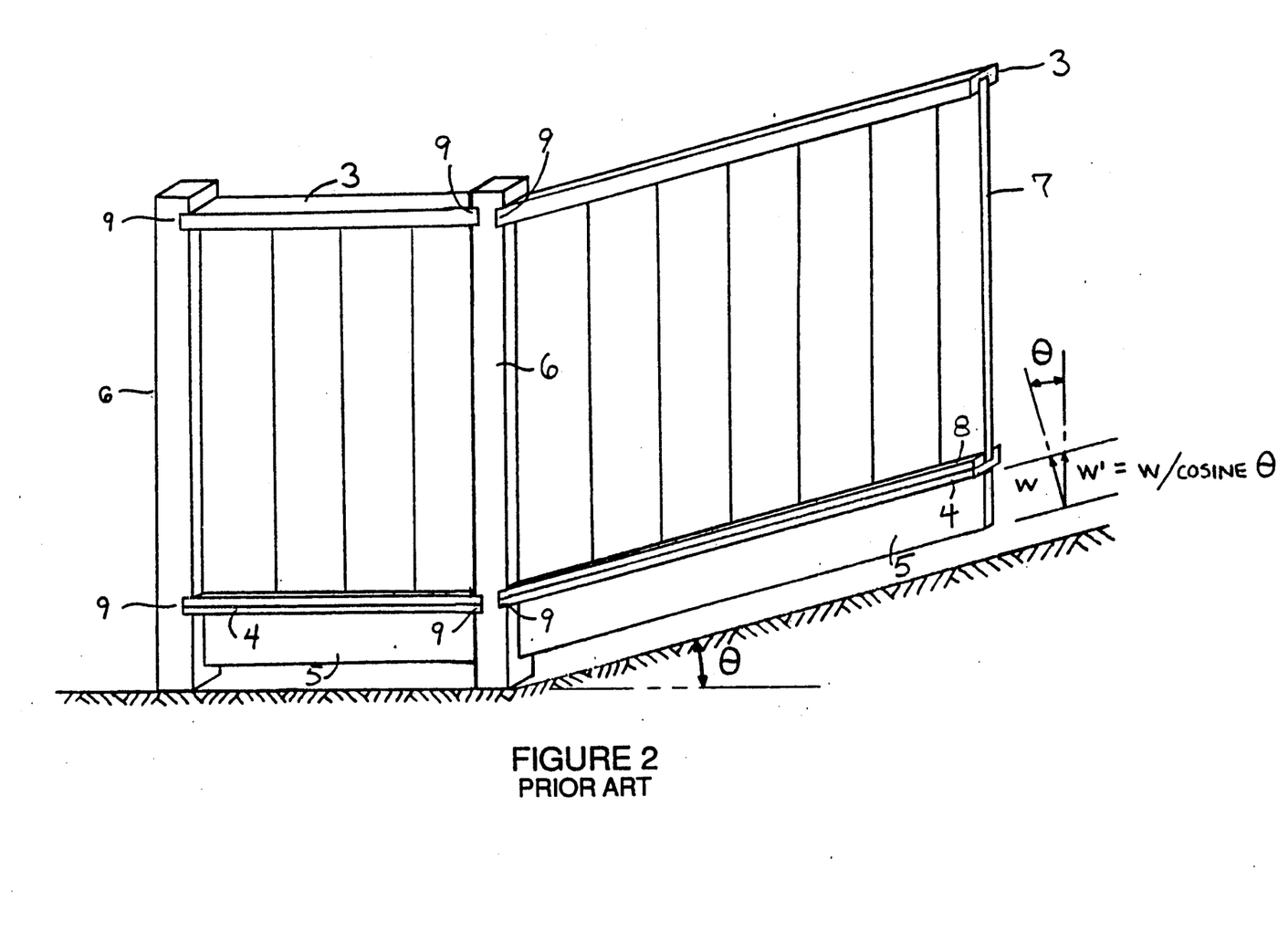
FIG. 2 shows a segment of the prior art fence built with traditional assembly methods.

Compare this to FIG. 2 which shows a segment of a good neighbor fence built in accordance with the prior art. This figure shows a fence built using traditional assembly methods. For structural strength the rails 3 and 4 are attached to the vertical posts by dado joints 9. Even on level ground as in the lefthand section, this is a complex, labor-intensive assembly process requiring special tools and a high degree of skill. When the dado joints must be angled because of sloping ground, as in the righthand section, the process becomes infinitely more complicated. The usual approach to save time and avoid this complication, is to replace the dado joints with butt joints and toe nail the ends of the rails to the vertical posts. Though this saves some time and money, it greatly compromises the structural strength of the fence because the butt joints are much weaker than dado joints. This is especially undersirable because a solid wood fence presents a lot of resistance to the wind compared to other styles of fences and therefore must have a lot of structural strength to stand up to the force of the wind.

The present invention addresses this problem directly. The system of metal brackets 1, 2, 30 in FIG. 1, provides a rapid and sturdy method for attaching the upper and lower rails 3 and 4 and the kickboard 5 to the vertical posts 6 without the need for costly or time consuming assembly methods. The level portion of a fence can be assembled quickly from precut or standard size lumber without much cutting and fitting on site, while the sloping portions of the fence can be made with lumber which is roughly miter cut to match the slope of the terrain.

Figure 3:
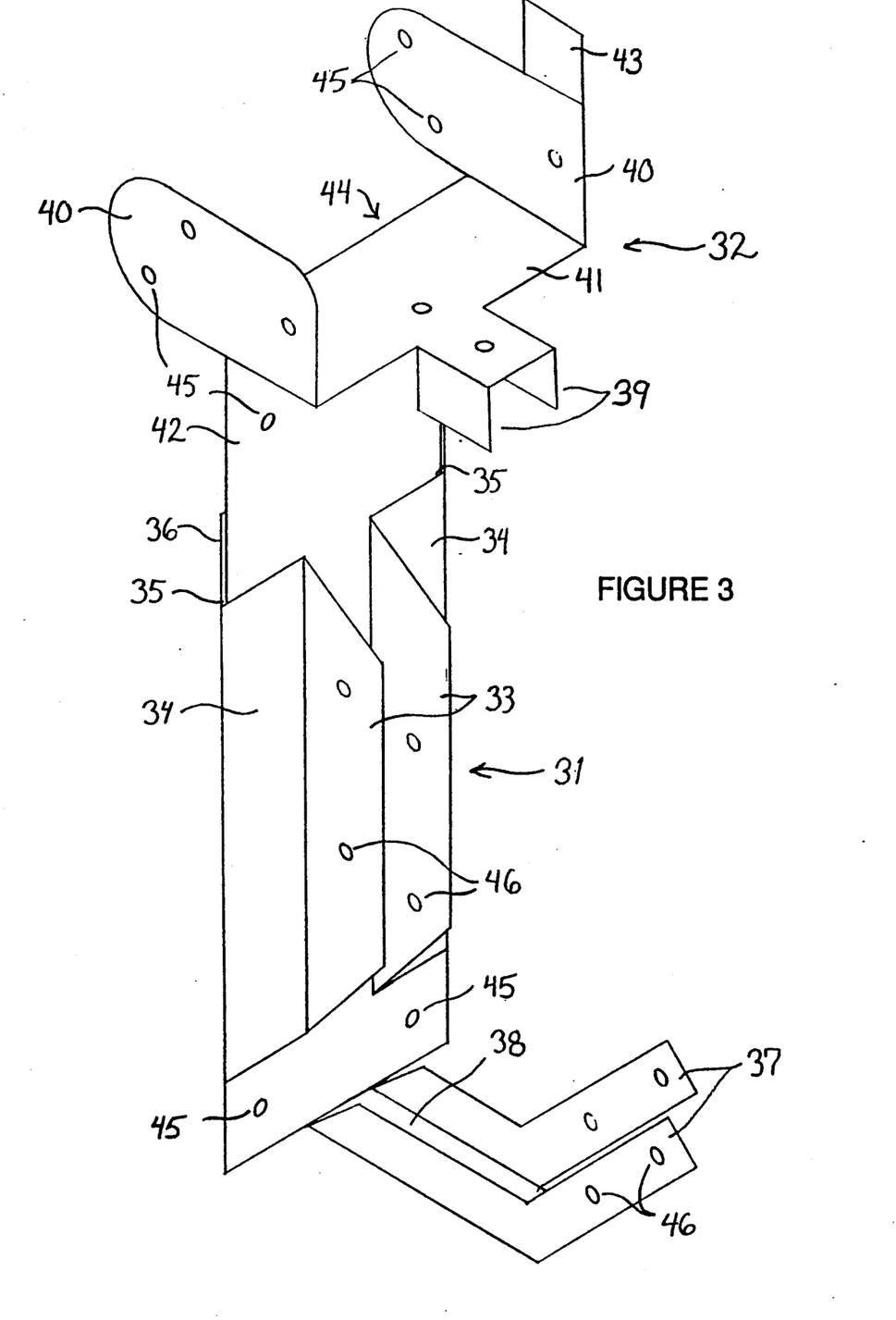
FIG. 3 shows the first embodiment of the adjustable lower bracket.
Figure 4:
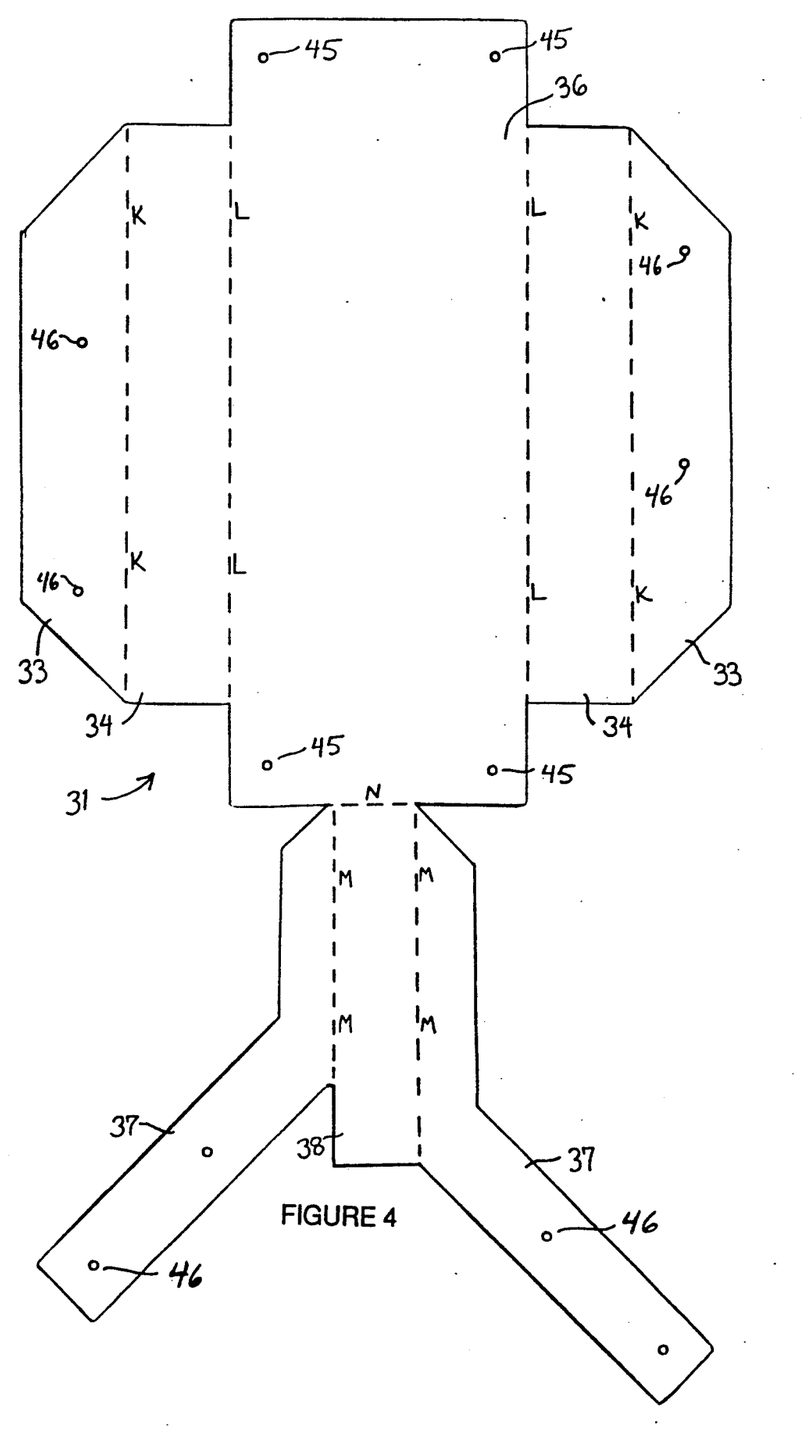
FIG. 4 shows the sheet metal pattern for the body of the adjustable lower bracket.
Figure 5:
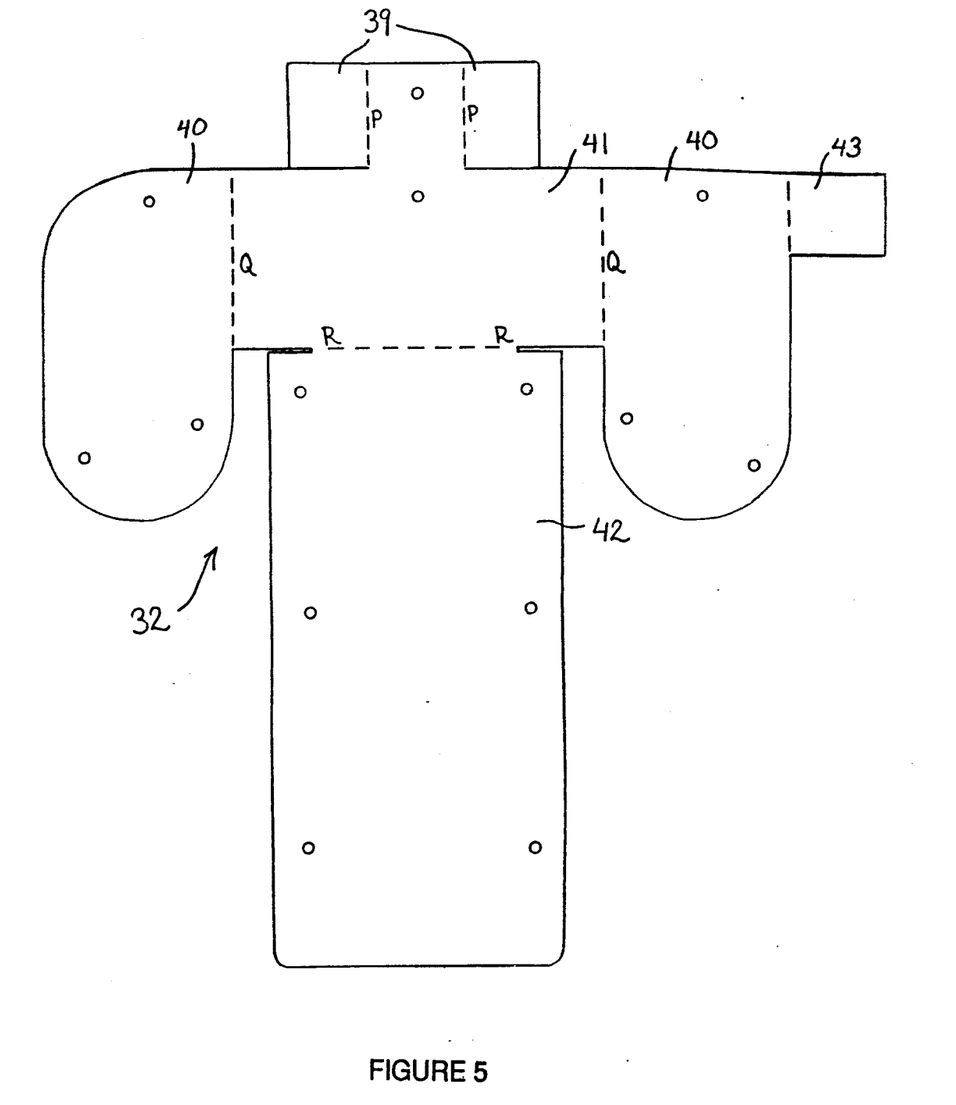
FIG. 5 shows the sheet metal pattern for the lower rail channel of the adjustable lower bracket.

The adjustable lower bracket, shown in FIG. 3, is made from two pieces of sheet metal. FIGS. 4 and 5 shows the parts of the adjustable lower bracket 30 as they are cut or punched from the flat metal sheet. The body 31 of the bracket which holds the kickboard 5 is formed from the part in FIG. 5, and the lower rail channel 32 which holds the lower rail 4 are formed form the part in FIG. 5. FIG. 3 shows how the two parts slide together after they are formed to complete the adjustable lower bracket 30. From the sheet metal pattern in FIG. 4, the body 31 of the lower bracket 30 is formed by bending the flanges 33 downward at a right angle along lines K, then bending the sides 34 180° inward along lines L, leaving a space 35 between the back 36 and the sides 34 wide enough for one thickness of sheet metal. The straps 37 are bent upward at a right angle along lines M, then the bottom seat 38 is bent upward along line N to an angle that matches the slope of the terrain. From the sheet metal pattern in FIG. 5, the lower rail channel 32 is formed by first bending the top saddle flanges 39 upward at right angles along lines P, then bending the the top flanges 40 downward at a right angle along lines Q, then bending the top seat 41 upward from the slider 42 along the line R at an angle that matches the slope of the terrain. The slider 42 is then inserted into the space 35 between the back 36 and the sides 34 of the body 31 to complete the adjustable bottom bracket 30. The sliding action between the body 34 and the lower rail channel 32 allows for adjustment of the height from the bottom seat 38 to the top seat 41 to accommodate the change in effective width W' of the kickboard 5 at different slopes to plus or minus 45°.

Figure 6:
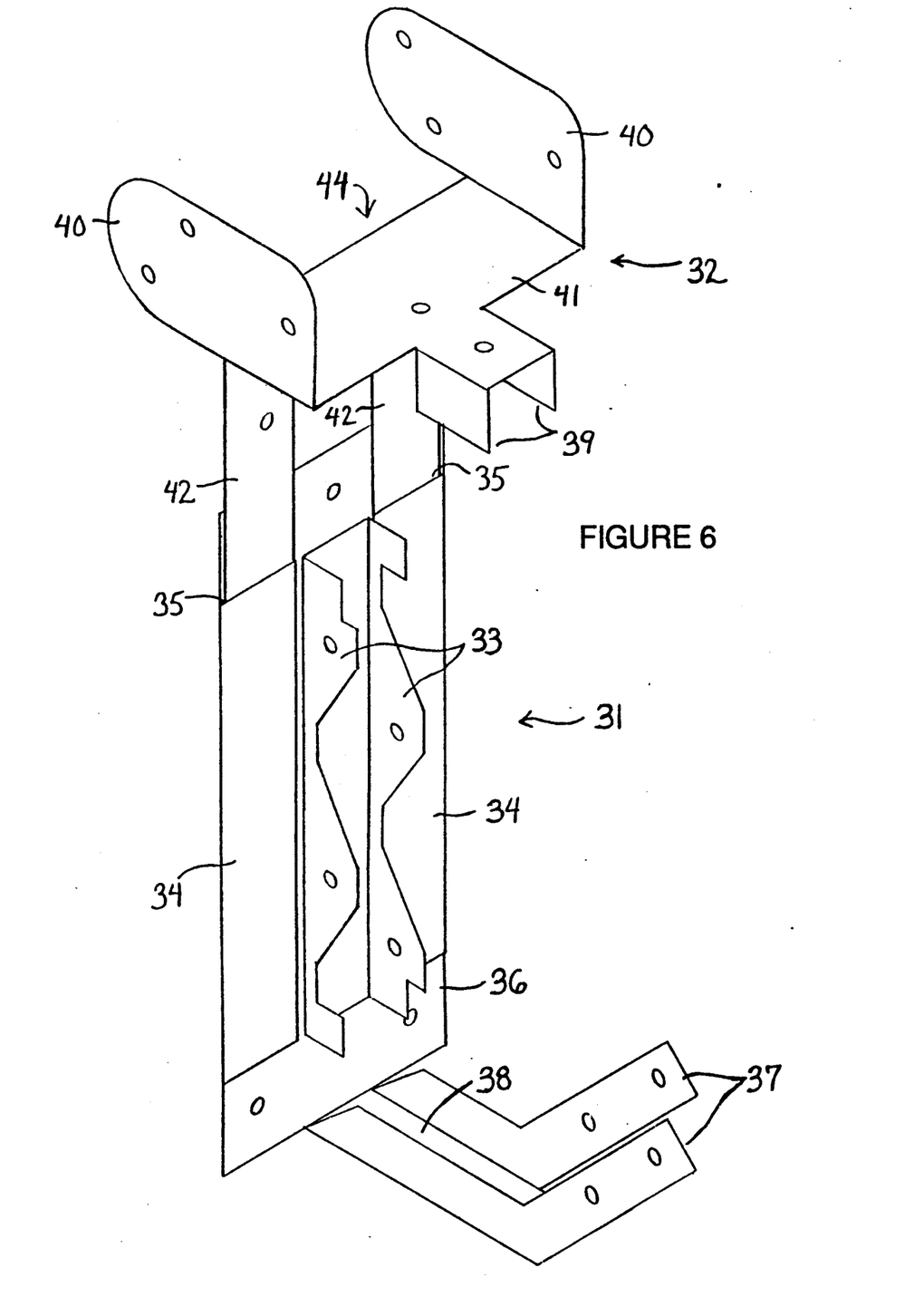
FIG. 6 shows a second embodiment of the adjustable lower bracket.
Figure 7:
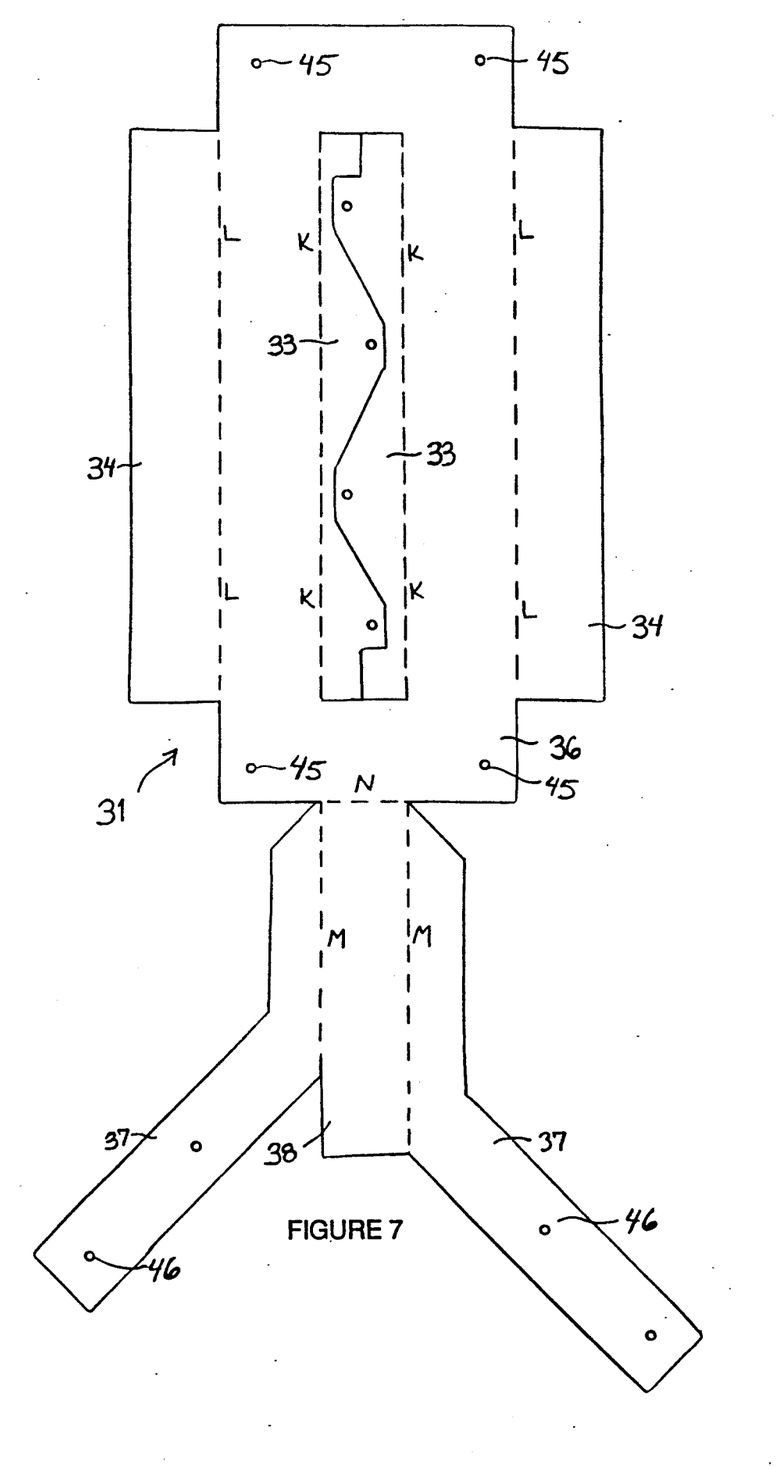
FIG. 7 shows the sheet metal pattern for the body of the second embodiment of the adjustable lower bracket.
Figure 8:
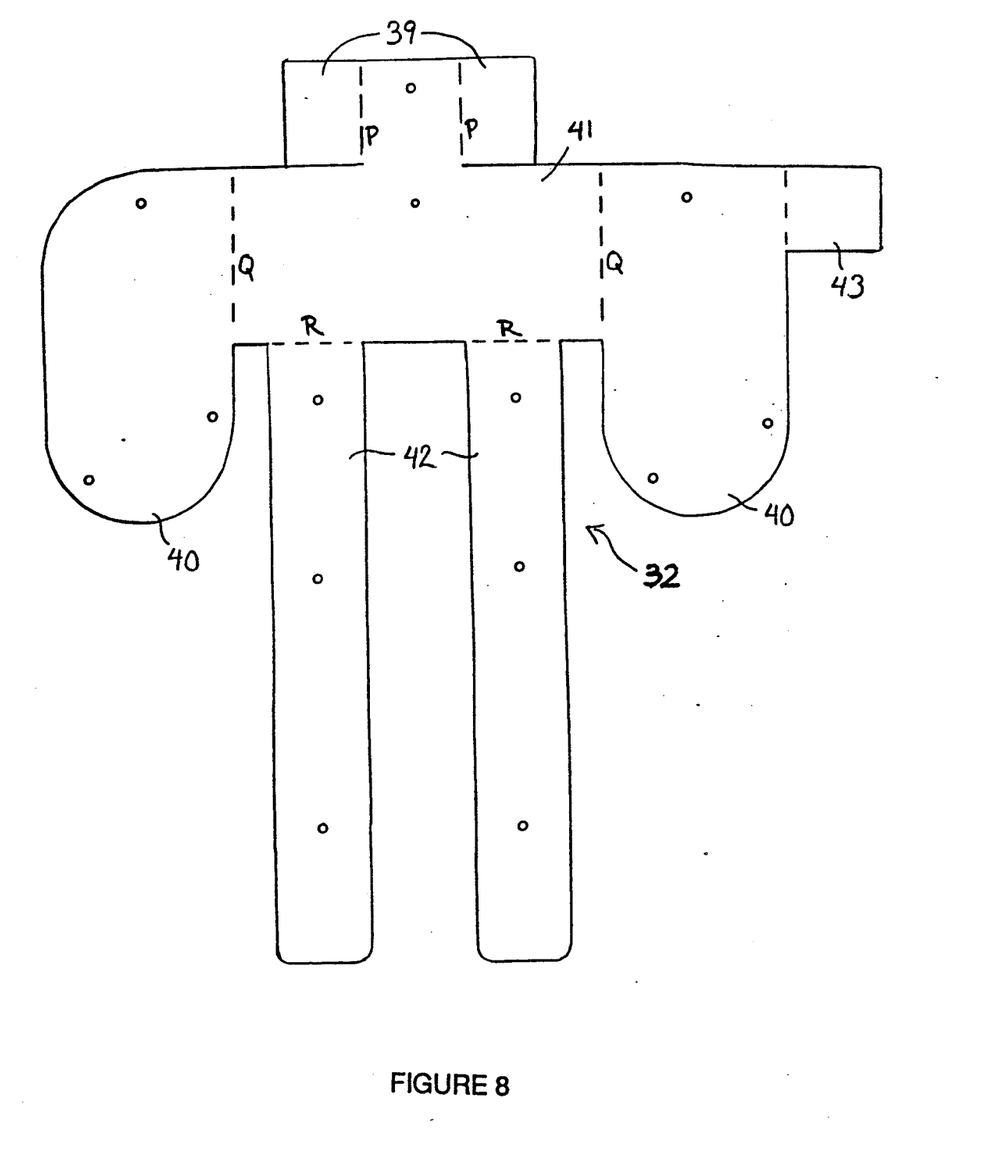
FIG. 8 shows the sheet metal pattern for the lower rail channel of the second embodiment of the adjustable lower bracket.

A second embodiment of the adjustable lower bracket 30 is shown in FIG. 6. Analogous parts of the second embodiment are labelled with the same numbers as in FIG. 3. FIG. 8 shows the sheet metal pattern to make the lower rail channel 32 of the bracket 30, and FIG. 7 shows the sheet metal pattern to make the body 31 of the bracket 30. The lower rail channel 32 of FIG. 8 may also be used with the body 31 of FIG. 4 to form an adjustable lower bracket 30.

In the finished lower bracket 30, the bottom seat 38, straps 37, flanges and top saddle 39 work together to create a channel to hold the kickboard 5 which is adjustable in angle and depth. The upper part 32 of the lower bracket 30 including the top seat 41 and the top flanges 40 form the shallow U-shaped lower rail support channel 44 which is adjustable in angle.

Holes 45 are provided in the back 36 and the top flanges 40 for attachment of the lower bracket 30 to the vertical fence post 6, as with nails or screws. In addition, holes 46 are provided in the straps 37 and flanges 33 for attachment to the kickboard 5 and in the top flanges 40 for attachment to the lower rail 4 and the nail board 8. It should be noted that it is preferable on all of the brackets to stagger the placement of the holes so that the nails or screws do not intersect when they enter from adjacent or opposite sides of the wood. It is also important to avoid placing too many holes in any line parallel to the grain of the wood as this would encourage splitting of the wood when the nails of screws are driven in.

Figure 9:
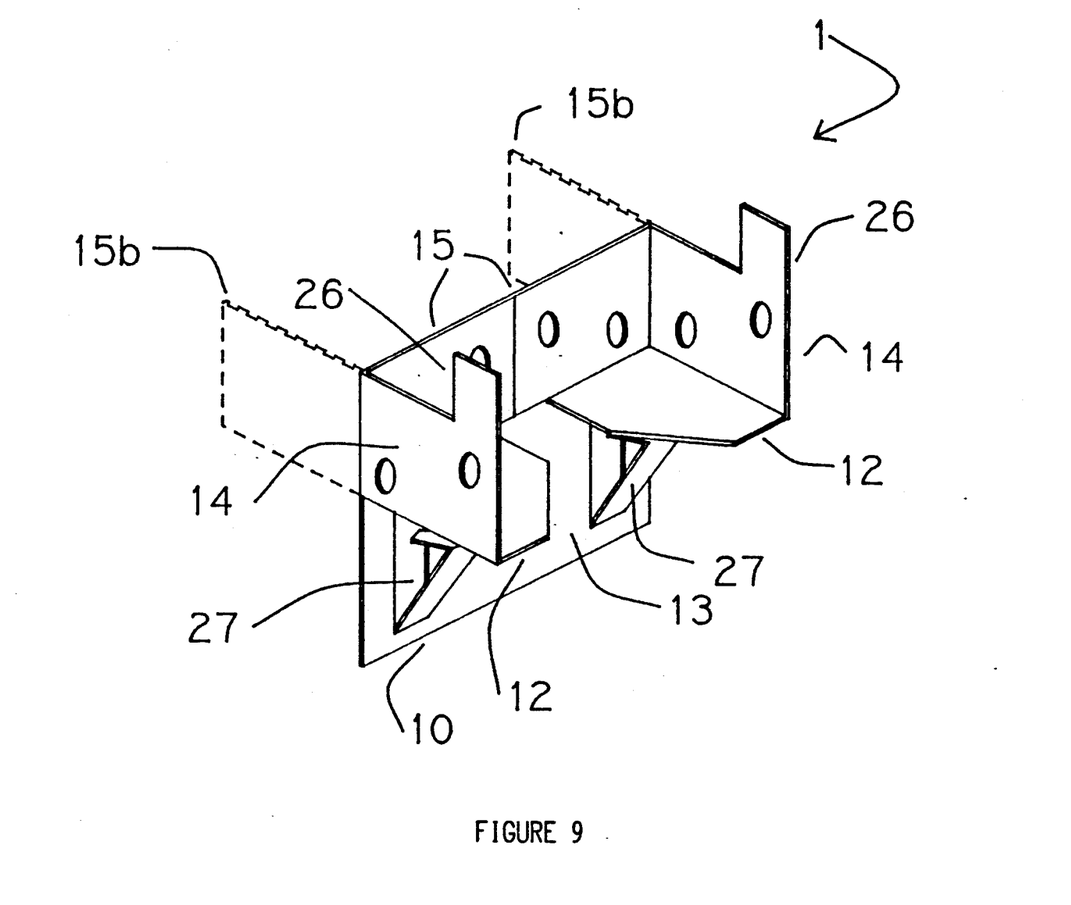
FIG. 9 shows the top bracket of the fence construction system.
Figure 10:
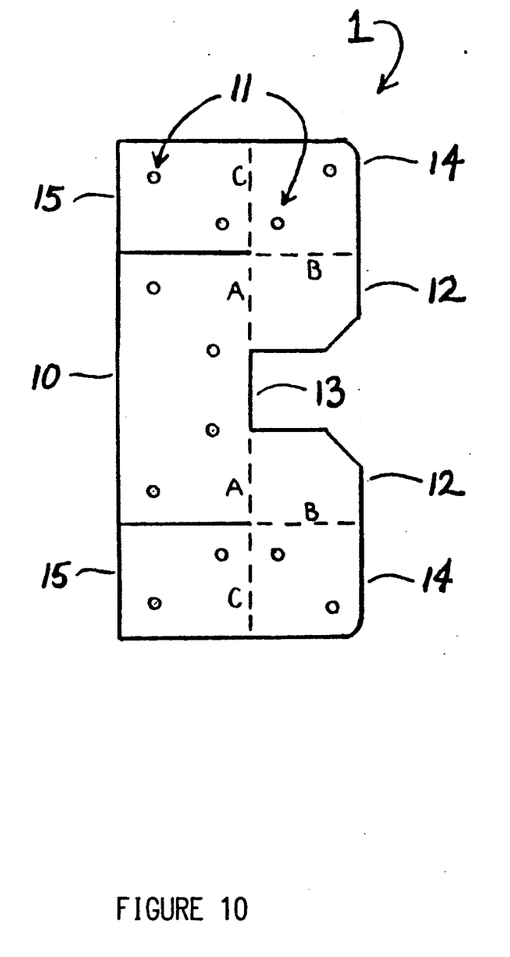
FIG. 10 shows the sheet metal pattern for the top bracket.

The upper bracket 1, shown in FIG. 9, is made from a single piece of sheet metal. FIG. 10 shows the upper bracket 1 as it is cut or punched from the flat metal sheet, while FIG. 9 shows the completed upper bracket 1. To form the upper bracket 1 the bottom flange 10 is folded downward at a right angle along the lines marked A in FIG. 3. Then, the upper reversible flanges 15 are bent upward at a right angle along lines C. The bracket is completed by bending the side flanges 14 upward at a right angle along lines B. The seats 12 together with the side flanges 14 form a shallow U-shaped upper rail support channel 16. There is a space 13 between the two seats 12 to accept the thickness of a fence board 7 so there will be no gaps in the fence. Holes 11 are provided in the bottom flange 10 and the upper reversible flanges 15 for attaching the bracket to the vertical fence post 6 as with nails or screws, and in the side flanges 14 for attachment to the upper rail 3.

For use on sloping terrain, it is preferable that the upper reversible flanges 15 may be left straight or straightened in the field as shown by phantom lines 15b for attaching to the sides of the fence post 6 rather than to the face. It should also be noted that the angle between the bottom flange 10 and the seats 12 may be adjusted in the field without special tools if angulation of the top rail 3 is necessary due to varying terrain along the fence line. Because of this feature, small changes in angle can be accommodated without the need to miter the upper rail and larger changes of angle can be accommodated by rough mitering without any sacrifice in the strength or aesthetics of the fence. Exact mitering would be necessary in the traditional construction to accommodate any change in angle at all.

Figure 11:
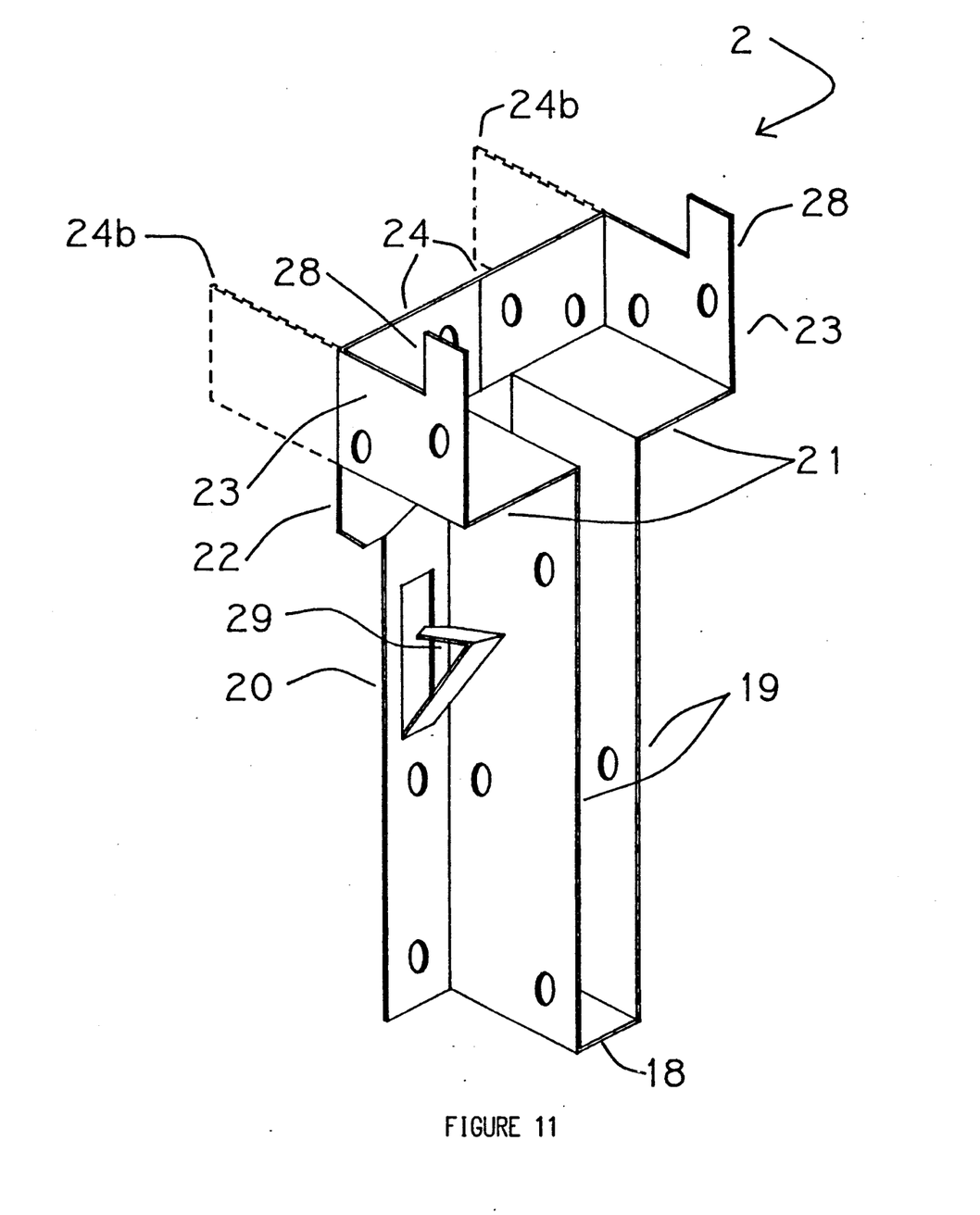
FIG. 11 shows a right angle bottom bracket for use with the fence construction system.
Figure 12:
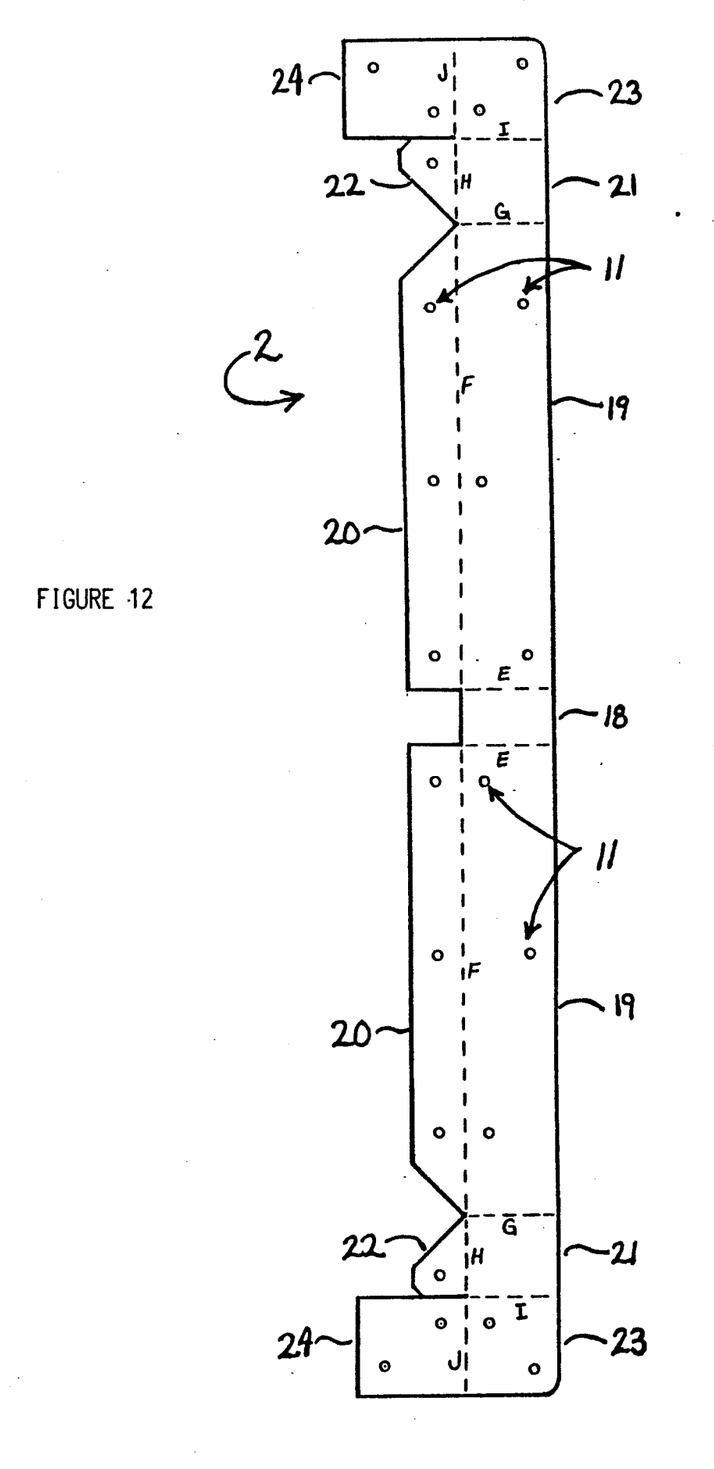
FIG. 12 shows the sheet metal pattern for the right angle bottom bracket.

FIG. 11 shows a right angle lower bracket that may be used with the fence construction system for sections of fence built on level ground. The right angle lower bracket 2 is also made from a single piece of sheet metal. FIG. 12 shows the lower bracket 2 as it is cut or punched from the flat metal sheet and FIG. 11 shows the completed lower bracket 2. To form the lower bracket 2, the bottom side flanges 20 and the intermediate flanges 22 are folded downward at a right angle along lines F and H, respectively, and the lower reversible flanges 24 are bent upward at a right angle along lines J. Then the top side flanges 23 are bent upward at a right angle along lines I and top seats 21 are bent downward along lines G. The bracket is completed by bending the ears 19 upward at a right angle from the bottom seat 18 along lines E.

The finished lower bracket 2 assumes a T shape overall. The lower portion of the T formed by the bottom seat 18 along with the ears 19 form the U-shaped kickboard support channel 17. The upper part of the T formed by the top seats 21 along with the top side flanges 23 form the shallow U-shaped lower rail support channel 25. Holes 11 are provided in the bottom side flanges 20, the intermediate flanges 22, and the lower reversible flanges 24 for attachment of the lower bracket 1 to the vertical fence post 6, as with nails or screws. In addition, holes 11 are provided in the ears 19 for attachment to the kickboard 5 and in the top side flanges 23 for attachment to the lower rail 4 and the nail board 8. As with the upper bracket 1, the top reversible flanges 24 of the lower bracket 2 may be left straight in the field as shown by the phantom lines 24b for attachment to the sides of the fence post 6 if desired.

Figure 13:
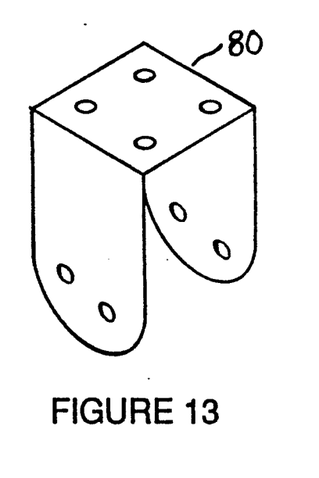
FIG. 13 shows a fence post cap for use with the fence construction system.

FIG. 13 shows a fence post cap 80 that may be used with the fence construction system. The cap 89 may be used as a decorative addition to the fence construction shown in FIG. 1, or it may be used structurally as a substitute for the upper bracket 1 in certain other fence constructions where the upper rail 3 is joined to the top of the fence post 6 rather than the side.

The preferred embodiments each of the upper and lower brackets are made from sheet metal, preferably 18 gauge galvanized sheet steel chosen for its strength and weatherability. However, other thicknesses or materials, such as aluminum, brass, stainless steel, or wrought iron, may be chosen for their availability, visual appeal, or other properties. Other coatings, such as paint, anodizing, or plastic coating, may be used in addition to or in place of the galvanization to provide weatherability or visual appeal. Other changes may be made in the form of the brackets to enhance their visual appeal. For instance, the brackets may be formed with scalloped or scroll-shaped edges, or with a textured surface so that their presence enhances the visual appeal of the traditional fence rather than detracting from it. It may be made skewed at any angle to conform to the perimeter angle of the fence.

In addition to the features listed above, each embodiment of the upper and lower brackets may include one or more quick attachment means for temporarily holding the fence together until the final attachment means such as nails or screws are driven in. This feature is very convenient for holding the fence components in place during assembly, especially if the job is being done single-handedly.

The upper bracket 1 in FIG. 9 may include a number of tab locks 26 extending from the side flanges 14 that may be bent down with a hammer to hold the top rail 3 in place. In addition, the upper bracket 1 may also include a number of speed prongs 27 formed integrally with the bottom flange 10 or the reversible flanges 15. These speed prongs 27 are made by cutting or punching an elongated vertical U-shaped slot to make a strip that is still attached at the lower end. The strip is then bent upward at an acute angle from the flange and the end portion is bent downward at a right angle and the end is sharpened. Once the upper bracket 1 is in the correct position the speed prongs 27 may be driven like nails into the fence post 6 to hold the upper bracket 1 in place.

Analogously, any of the lower bracket constructions in FIGS. 3, 6 or 11 may include a number of tab locks 28, 43 extending from the top flanges 23, 40 to hold the lower rail 4 and the nail board 8 in place. As well, any of the lower bracket constructions may include a number of speed prongs 29, as shown in FIG. 11, formed integrally with the lower bracket that may be driven like nails into the fence post 6 to hold the lower bracket 2 or 30 in place.

ERECTING A GOOD NEIGHBOR FENCE USING THE FENCE CONSTRUCTION SYSTEM FOR SLOPING TERRAIN

Please refer to FIG. 1 for an understanding of this fence assembly procedure. First, wooden fence posts 6 are erected at preselected intervals along the fence line.

The bodies 31 of the adjustable lower brackets 30 are affixed at the appropriate height on the opposing faces of each fence post 6. The kickboard 5 is miter cut to the correct angle by measurement or by aligning the board with the fence posts and tracing the line to be cut. The top seat 41 of the lower bracket 30 is then raised until there is enough clearance for the mitered kickboard 5. The kickboard 5 is then inserted into the bracket 30 and the bottom seat 38 is bent to the correct angle and the straps 37 fastened to the kickboard 5. The top seat 41 is then bent to the correct angle and the lower rail channel 32 is lowered until the top saddle 39 rests on the kickboard 5 holding it in place. The top flanges 40 are nailed or screwed to the fence post, then the L-shaped lower rail 4 is mitered and inserted into the lower rail support channel 44 and fastened. The lower flanges 10 of the upper brackets 1 are affixed to the fence posts 6 at the correct height. The upper rail 3 which is shaped like an inverted U is placed into the upper rail support channel 16, the seat 12 is bent to the correct angle, the flanges 15 are fastened to the fence posts, then the upper rail 3 is fastened in place. One by one miter cut fence boards 7, which may be plain boards, ships lap boards, or tongue-and-groove boards, are placed between the upper rail 3 and lower rail 4 until the fence is solidly filled. Then the fence is completed by dropping the nail board 8 into the lower rail support channel 44 and fastening it to lock the fence boards 7 in place.

Figure 14:
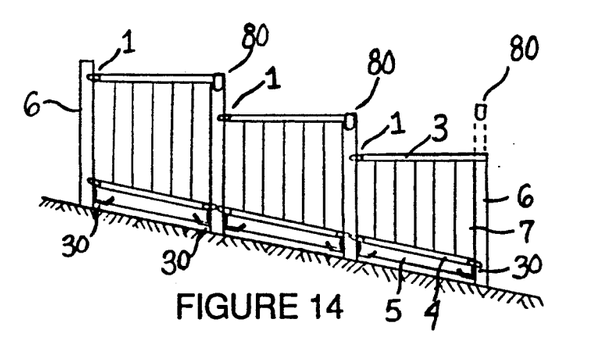
FIG. 14 shows a stepped fence assembled with the fence construction system.
Figure 15:
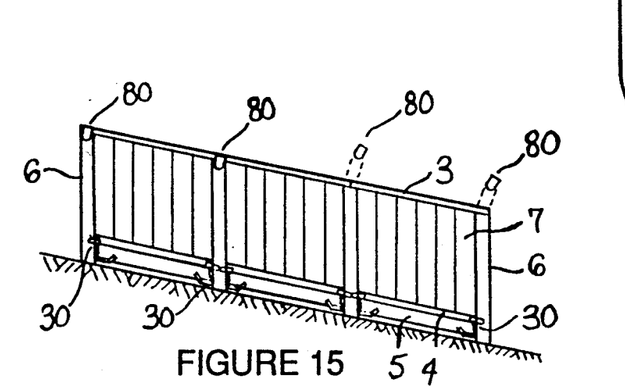
FIG. 15 shows a sloped fence assembled with the fence construction system.
Figure 16:
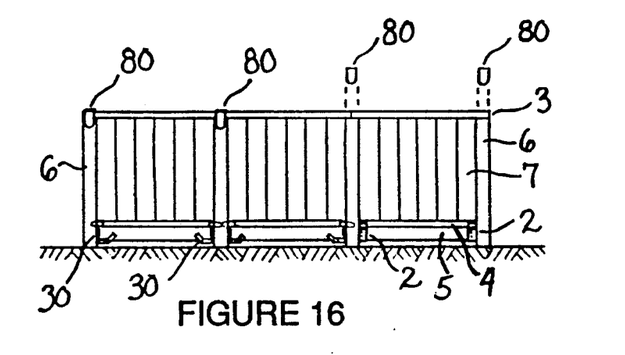
FIG. 16 shows a level fence assembled with the fence construction system.

Variations of the procedure outlined above may be used to construct alternate styles of fences using the fence construction system. Examples of these are shown in FIGS. 14, 15 and 16. FIG. 14 shows a stepped fence built on sloping ground. The slanting lower rail 4 and kickboard 5 are held in place by the adjustable lower brackets 30. The uphill ends of the horizontal upper rails 3 are fastened to the fence posts 6 at right angles using the upper brackets 1. On the downhill ends of the upper rails 3, they are fastened to the top of the fence posts 6 using the fence post caps 80. FIG. 15 shows a construction for a sloping fence that uses no upper brackets 1. The slanting upper rails 3 are instead fastened to the top of the fence posts 6 using the fence post caps 80. FIG. 16 shows a construction for a fence on level ground that also uses no upper brackets 1. In the two segments of the fence on the left, the lower rail 4 and kickboard 5 are held in place by the adjustable lower brackets 30, while in the segment on the right, they are held by right angle lower brackets 2. This is to show the interchangeability of these two styles of brackets for construction on level ground. The upper rails of this construction are fastened to the top of the fence posts using fence post caps.

The foregoing description should not be construed as limiting the scope of the invention but merely as illustrative of the presently preferred embodiments. Many variations or other uses for the invention, such as the building of railings, decks, or other types of construction, may be made without departing from the spirit or scope of the invention. Thus the scope of the invention should be determined by the appended claims and not limited by the examples given.

I claim:

1. A fence construction system comprising:
an adjustable lower bracket adapted for attachment to a fence post comprising:
a body having a lower channel for receiving the kickboard of a fence, said lower channel being adjustable in angle,
and an upper channel for receiving the lower rail of a fence, said upper channel being adjustable in angle, and said upper channel being slidably attached to said body such that the distance between said upper channel and said lower channel is adjustable.

2. The fence construction system of claim 1 wherein said lower bracket further comprises a plurality of holes for attachment of said lower bracket to a fence post as with nails or screws, and said upper channel and said lower channel further comprise a plurality of holes for attachement of said brackets to the lower rail and the kickboard of a fence.

3. The fence construction system of claim 1 wherein said lower bracket is made of sheet metal.

4. The fence construction system of claim 3 wherein said lower bracket further comprises one or more sharpened speed prongs formed integrally with said lower bracket for attachment of said bracket to a fence post.

5. The fence construction system of claim 3 wherein said upper channel and said lower channel further comprise one or more tab locks formed integrally with said channels which may be bent over for attachment of said bracket to the rail and the kickboard of a fence.

6. The fence construction system of claim 1 further comprising an upper bracket for attachment of the upper rail of a fence to a fence post.

7. The fence construction system of claim 1 further comprising a fence post cap for attachment of the upper rail of a fence to a fence post.

8. The fence construction system of claim 1 further comprising a right angle lower bracket for attachment of a horizontal lower rail of a fence to a fence post.

* * * * *

UNITED STATES PATENT AND TRADEMARK OFFICE
CERTIFICATE OF CORRECTION

PATENT NO. : 5,190,268
DATED : March 2, 1993
INVENTOR(S) : Belarmino G. Espinueva It is certified that error appears in the above-indentified patent and that said Letters Patent is hereby corrected as shown below:

Col. 3, line 19, change "162" to --7/8--.

Signed and Sealed this

Nineteenth Day of April, 1994

*Attest:*

BRUCE LEHMAN

*Attesting Officer*     Commissioner of Patents and Trademarks